United States Patent

Bauhus et al.

[15] 3,665,774

[45] May 30, 1972

[54] DRIVING ASSEMBLY

[72] Inventors: Gunter Bauhus; Hans Schmidtchen, both of Nurnberg, Germany

[73] Assignee: Gebr. Buhter Nachfolger GmbH, Nurnberg, Germany

[22] Filed: Dec. 30, 1969

[21] Appl. No.: 889,283

[52] U.S. Cl. .............................74/325, 74/416, 74/421 A
[51] Int. Cl. ....................F16h 3/02, F16h 1/20, F16h 1/12
[58] Field of Search ............74/421 A, 325, 342, 416, 849, 74/664

[56] References Cited

UNITED STATES PATENTS

| 456,632 | 7/1891 | Mosher | 74/342 X |
| 1,482,715 | 2/1924 | Strand | 74/342 |
| 1,521,882 | 1/1925 | Doubler | 74/664 |
| 1,854,214 | 4/1932 | Moorhead | 74/421 A |
| 2,101,515 | 12/1937 | Schmitter | 74/421 A |
| 2,277,614 | 3/1942 | Suhner | 74/342 |
| 2,441,727 | 5/1948 | Snow | 74/342 X |
| 3,503,274 | 3/1970 | Howard | 74/325 |

FOREIGN PATENTS OR APPLICATIONS

| 120,751 | 1/1948 | Sweden | 74/342 |

*Primary Examiner*—Carlton R. Croyle
*Assistant Examiner*—Thomas C. Perry
*Attorney*—Hane, Baxley & Spiecens

[57] ABSTRACT

A driving assembly has a gearing and a motor the drive shaft of which can be selectively coupled with one of two or more input gears of the gearing thereby changing the ratio of transmission of the gearing. The motor is exchangeably mounted and may have two drive gears either one of which can be coupled to an input gear of the gearing.

11 Claims, 7 Drawing Figures

DRIVING ASSEMBLY

The invention relates to a driving assembly for driving devices or apparatus having a rather low power requirement such as toys and more particularly to a driving assembly including an electric miniature motor and a gearing.

BACKGROUND

There are known devices in which the gearing is incorporated in the toy itself or another low power consumer and thus does not constitute an independent structural component whereas the motor itself does constitute such component.

It is desirable to have available a driving assembly which can be used for driving many different devices and apparatus and is thus suitable for use in many different fields. Such versatility of use requires that there is provided a gearing in addition to the motor. It is further necessary that the driving assembly can be adapted for a wide range of conditions and such adaptability, in turn, requires that the ratio of transmission of the gearing is variable which generally entails comparatively high costs.

THE INVENTION

It is a broad object of the invention to provide a novel and improved driving assembly of the general kind above referred to which permits a convenient change in the ratio of transmission and also a convenient exchange of the motor of the assembly.

A more specific object of the invention is to provide a novel and improved driving assembly of the general kind above referred to which includes a gearing with two or more ratios of transmission and an exchangeably mounted motor and thus can be used for a wide range of operational conditions.

SUMMARY OF THE INVENTION

The afore pointed out objects, features and advantages of the invention and other objects, features and advantages which will be pointed out hereinafter and are set forth in the appended claims are obtained by providing a gearing with two preferably coaxially rotatable input gears having different diameters and/or different numbers of teeth and by further providing an exchangeably mounted motor the drive shaft of which mounts a drive gear such as a pinion or bevel gear which can be selectively coupled with either one of the input gears of the gearing.

As is evident, such an arrangement provides two different rotational speeds at the output gear or gears of the gearing depending upon whether the motor shaft is coupled to one or the other of the input gears. In the event the two input gears and the drive gear of the motor are mounted on parallel shafts and coupling is effected by using spur gears, selective coupling with the input gears can be obtained by placing the gear on the motor shaft at different distances from the bearing bracket or other housing part of the motor.

In the event the motor shaft and the shaft mounting the input gears are normal to each other a similar simple and convenient engagement can be obtained by using bevel gears or crown gears as input gears. The drive gear such as a pinion on the motor shaft which is closest to the motor housing is then engageable with the input gear having the large diameter and the drive gear which is further from the motor housing is engageable with the input gear having the smaller diameter. Further changes in the ratio of transmission can be conveniently obtained by exchanging the drive gear such as a pinion or bevel gear on the shaft of the motor.

The invention also provides that the motor can be mounted in reversed position with reference to the gearing and has on both sides a protruding shaft portion mounting a drive gear such as a pinion or bevel gear. Each of these gears is then engageable with a different input gear. With such arrangement the desired ratio of transmission is conveniently obtainable by simply reversing the position of the same motor with respect to the gearing.

According to the invention at least one of the two input gears of the gearing is freely rotatable on its shaft for the gears, but both input gears may be rotatable on the common shaft.

Each input gear may be part of a gear train. The two gear trains can be joined to form a single gearing having at its output gear a selected ratio of transmission.

It is also within the concept of the invention that further gears which are, directly or indirectly, in mesh with the input gears have different ratios of transmission. Eventually, the subsequent gears in mesh with the input gears can be joined to form a single gearing. Such an arrangement permits the selection of a substantial number of possible different ratios of transmission. Changes in the ratio of transmission can also be obtained by using different input gears, or by using a different drive gear on the motor shaft or by using different transmission ratios in the separate gear trains extending from the different input gears.

It is further within the concept of the invention that the housing for the gearing is provided with a seat for exchangeably mounting the motor of the assembly. Exchangeability of the motor has the advantage that motors using different voltage and having different outputs can be coupled with one and the same gearing.

The driving assembly according to the invention is very compact and its overall dimensions are comparatively small. These features are of great importance in the areas of use for which the driving assembly of the invention is particularly intended, such as toys.

A further structure according to the invention provides that the housing of the motor is fitted in a recess or space defined between a side wall of the housing of the gearing and a lug on the housing of the gearing and engaging a recess in the motor housing. Such location of the motor permits a convenient removal of the motor. This kind of mounting of the motor can also be effected by providing the recess in the housing of the gearing and the lug on the housing of the motor.

The afore described structural arrangements permit a convenient exchange of the motor at any time irrespective of whether the motor is secured to the housing of the gearing, for instance, by a screw connection or whether the motor together with the gearing is mounted on or within the housing of a toy or other device to be driven and secured thereto.

A particularly suitable arrangement is to provide on the housing of the gearing an extension or bracket underlying the motor and to mount the lug for supporting the motor on the extension or bracket. The lug may be either secured to the extension or integral therewith. The extension can also be used to accommodate parts of the gearing whereby the driving assembly obtains a particularly compact construction.

External preferably springy connectors or jacks may be provided on the bearing bracket or the housing of the motor on the commutator side thereof. These connectors or jacks may be connected with the commutator brushes and are adapted to cooperate with external contact elements, etc. Such an arrangement avoids the need for rewiring or soldering the circuit connections when the motor is exchanged.

DETAILED DESCRIPTION OF THE INVENTION

In the accompanying drawing a preferred embodiment of the invention is shown by way of illustration and not by way of limitation.

Figure 1:
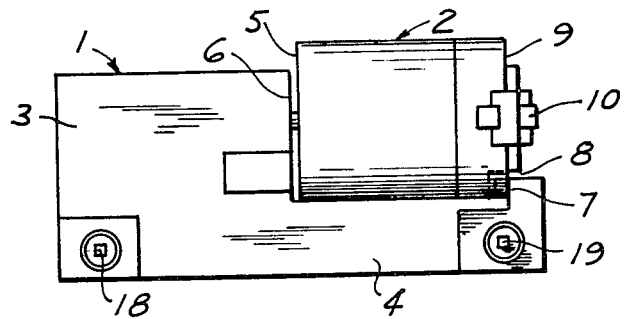
FIG. 1 is a diagrammatic elevational side view of a driving assembly according to the invention.

Referring now to the figures more in detail, the exemplified driving assembly comprises a gearing 1 and a drive motor 2 such as a miniature electric motor. The gearing is mounted within a housing 3 from which extends a support bracket 4 underlying the motor. A bearing bracket 5 on the motor or a side wall of the motor casing is adjacent to or in abutment with a side wall 6 of gearing housing 3. Bracket 4 terminates in a lug 7 engaged with a recess 8 in a second bearing bracket 9 of motor 2, or in the motor casing. The bearing bracket 9 mounts preferably springy contact connectors 10 of conventional design, which should be visualized as being connected to the commutator brushes (not shown) of the motor. The connectors also serve to make contacts with pole elements (not shown) of a device or apparatus with which the driving assembly is designed to coact, such as a toy vehicle.

Figure 2:
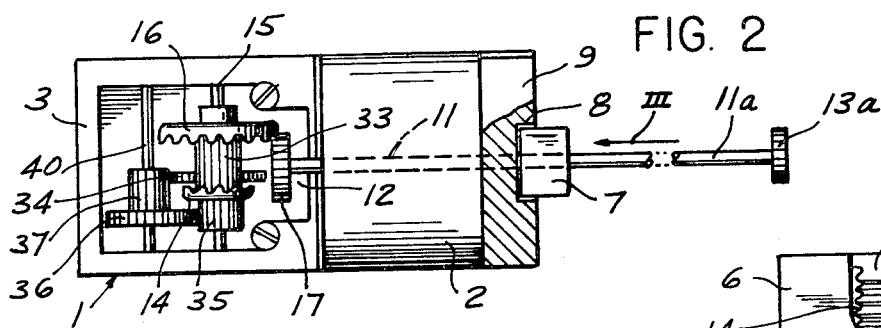
FIG. 2 is a partially broken open plan view of the assembly in one operational position.
Figure 3:
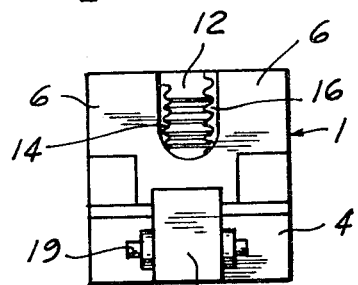
FIG. 3 is an elevational side view in the direction of arrow III IN FIG. 2, the motor of the assembly being detached.
Figure 2A:
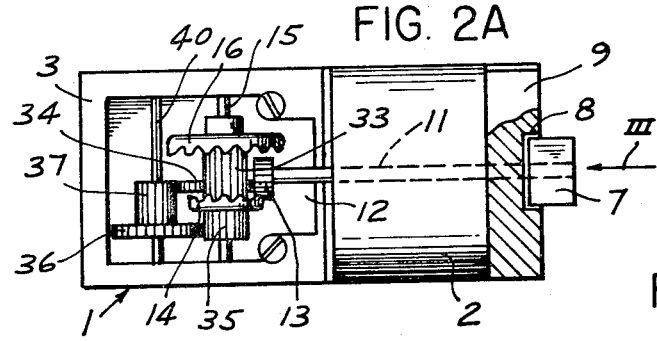
FIG. 2A is a partially broken open plan view of the assembly in another operational position.
Figure 4:
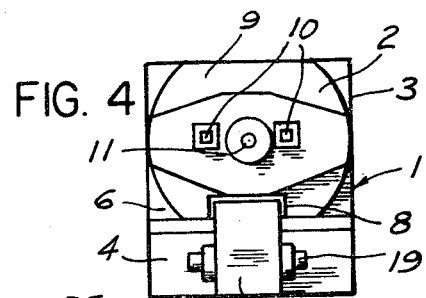
FIG. 4 is an elevational side view similar to FIG. 3 but showing the motor attached to the assembly.

The motor has a drive shaft 11 which protrudes into an upwardly open cutout 12 in side wall 6 of gearing housing 3. Shaft 11 has secured thereon a gear 17 as shown in FIG. 2, or a gear 13 as shown in FIG. 2A, gear 13 having a smaller diameter than gear 17. The invention provides that either two motors 2 are provided, one having on its shaft gear 17 and the other gear 13, or one motor the drive shaft of which mounts at one end gear 17 and at the other end gear 13 as is indicated in FIG. 2A at 11a and 13a. With the latter arrangement one motor can be used for the operational positions shown in FIGS. 2 and 2A by simply reversing the position of the motor when placing it on bracket 4, for a purpose which will be more fully explained hereinafter. Gears 17 and 13 constitute input gears for gearing 1.

The gearing 1 further comprises a shaft 15 journaled in housing 3. This shaft seats a first pair including a crown gear 16 and a pinion 33 fixed on the shaft and preferably also fixedly secured to each other, and a second pair including crown gear 14 and a pinion 35. As it is clearly shown, the diameter of gear 14 is smaller than that of gear 16. Gear 14 and pinion 35 are fixedly secured to each other but freely rotatable on shaft 15 and thus independent of a rotation of gear 16 and pinion 33. Gear 16 and pinion 33 can also be freely rotatable on shaft 15, but must then be fixedly secured to each other for a purpose which will become apparent from the subsequent description.

Housing 3 has further journaled therein a shaft 40 on which are seated gear 36 and pinion 37 fixedly secured to each other but freely rotatable on the shaft.

Gearing 1 also includes a gear 34 rotatably mounted in housing 3. This gear is in mesh with pinions 33 and 37 as it is clearly shown, and constitutes the output gear of the gearing.

There are further shown two shafts 18 and 19 which may be visualized as the front and rear axle, respectively, of a vehicle to be propelled by the driving assembly according to the invention. The two axles are arranged to be coupled to drive shaft 11 of the motor in a manner which will become apparent from the subsequent description.

The driving assembly as hereinbefore described operates as follows:

As previously pointed out, it is a basic object of the invention to change the transmission ratio between the input gear 13 or 17 on drive shaft 11 and output gear 34 and thus axles 18 and 19 in a convenient and simple fashion.

Figure 2B:
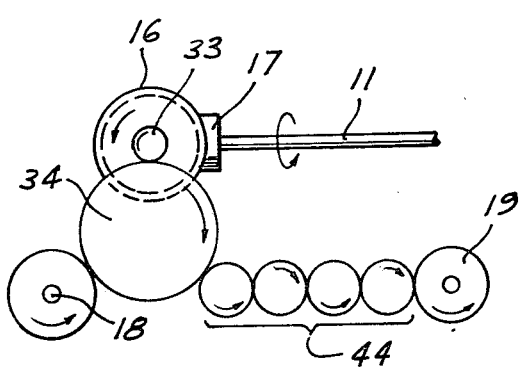
FIG. 2B is a diagrammatic view of the effective gear train in the operational position of the assembly according to FIG. 2.

Let it first be assumed that the axles are to be driven via gear 34 at the transmission ratio determined by gear 17, that is, with the driving assembly in the operational position of FIG. 2. As it is clearly shown in this figure and also in FIG. 2B, a gear train is established including gear 17, large crown gear 16, pinion 33, output gear 34 and axle 18. FIG. 2B also shows that axle 19 is also driven by gear 34. There are shown in this figure by way of example four intermediate gears 44, but of course the drive for axle 19 can be derived from gear 34 in any other conventional fashion.

Let it now be assumed that it is desired to change the transmission ratio between motor shaft 11 and axles 18 and 19 from that obtained in the operational position of FIG. 2. For this purpose, gear 13 is placed in coacting relationship with crown gear 14. As has been mentioned, gear 13 has a smaller diameter than gear 17 and crown gear 14 has a smaller diameter than crown gear 16 thereby correspondingly changing the transmission ratio of the gearing.

Figure 2C:
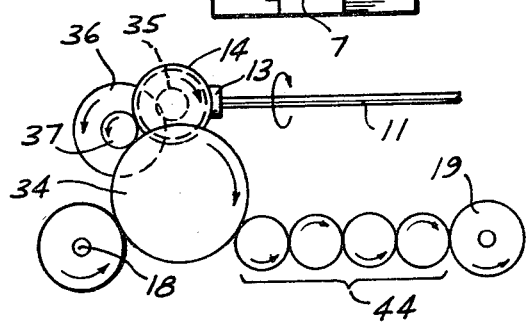
FIG. 2C is a diagrammatic view of the effective gear train in the operational position of the assembly according to FIG. 2A.

As it is clearly shown in FIGS. 2A and 2C, the following gear train is now formed. Gear 13, crown gear 14, pinion 35, gear 36, pinion 37, output gear 34 and axle 18. Axle 19 is again shown to be coupled to gear 34 by intermediate gears 44.

As is evident, friction gears may be used instead of the illustrated toothed gears.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A driving assembly for mechanical toys and other low power consumers, said assembly comprising in combination:
   a housing;
   drive means;
   a first and a second input gear, said gears being selectively mountable on said housing for driving the selected gear by said drive means;
   a first shaft rotatably supported by said housing;
   a first transmission means including a gear and a pinion secured to each other and fixedly seated on said shaft, said gear being engageable with the first input gear for driving the shaft via said gear by the drive means;
   a second transmission means including a gear and a pinion fixedly secured to each other and freely rotatable on said shaft, said gear of the second transmission means being engageable with the second input gear for driving the said second input gear by the drive means;
   the diameters of the gears of the first and second transmission means being different from each other;
   a second shaft rotatably supported by the housing;
   a third transmission means including a gear and a pinion secured to each other and seated freely rotatable on the second shaft, the gear of the third transmission means being in mesh with the pinion of the second transmission means;
   a rotatably mounted output gear, said output gear being in mesh with the pinion of the first transmission means and the pinion of the third transmission means,
   whereby the rotational speed of the output gear is variable by selecting either the first or the second input gear for driving the output gear via the selected input gear.

2. The driving assembly according to claim 1 wherein said first and second input gears have different diameters thereby varying the ratio of transmission between the selected input gear and the output gear.

3. The driving assembly according to claim 1 wherein said drive means comprises an electric motor having a drive shaft protruding at opposite ends of the motor, one of said input gears being mounted on one protruding shaft end, and the second input gear on the other protruding shaft end.

4. The driving assembly according to claim 1 and comprising a driven axle, said axle being drivingly coupled with said output gear.

5. The driving assembly according to claim 4 and comprising a second driven axle, said second axle being also drivingly coupled with the output gear.

6. The driving assembly according to claim 1 wherein said drive means comprises an electric motor and said housing having on its outside a seat for supporting the motor and locating the same with reference to the housing.

7. The driving assembly according to claim 6 wherein said seat is formed by a side wall portion of the housing and a lug protruding from the outer wall of the housing, said motor fitting in the space defined by said side wall and said lug.

8. The driving assembly according to claim 7 wherein said housing comprises an extension, said lug being provided at the free end of said extension, said extension constituting a support base for the motor.

9. The driving assembly according to claim 7 wherein the motor comprises a casing having two opposite substantially parallel side walls, said side walls being in abutment with said side wall of said housing and the lug when the motor is fitted in said space.

10. The driving assembly according to claim 9 wherein the motor casing has a recess in the outer wall, said lug being engageable with said recess.

11. The driving assembly according to claim 9 wherein contact jacks adapted for connection with commutator brushes of the motor are mounted in a side wall of the motor casing.

* * * * *